US006763263B2

(12) United States Patent
Gregory et al.

(10) Patent No.: US 6,763,263 B2
(45) Date of Patent: Jul. 13, 2004

(54) METHOD AND APPARATUS FOR PRODUCING AN ELECTRICAL PROPERTY IMAGE USING A CHARGE CORRELATION MATRIX

(75) Inventors: Christopher William Gregory, Whitefish Bay, WI (US); William D. Gregory, Shorewood, WI (US)

(73) Assignee: WiSys Technology Foundation, Madison, WI (US)

( * ) Notice: Subject to any disclaimer, the term of this patent is extended or adjusted under 35 U.S.C. 154(b) by 392 days.

(21) Appl. No.: 09/916,821

(22) Filed: Jul. 26, 2001

(65) Prior Publication Data

US 2002/0038096 A1 Mar. 28, 2002

Related U.S. Application Data

(60) Provisional application No. 60/221,465, filed on Jul. 26, 2000.

(51) Int. Cl.[7] ................................................ A61B 5/00
(52) U.S. Cl. ....................... 600/547; 324/692; 324/693; 324/715
(58) Field of Search .................... 600/547; 324/692, 324/693, 713, 715, 717, 722

(56) References Cited

U.S. PATENT DOCUMENTS

| 4,493,039 A | | 1/1985 | Gregory |
| 5,381,333 A | | 1/1995 | Isaacson et al. |
| 5,641,965 A | | 6/1997 | Barber et al. |
| 6,122,544 A | * | 9/2000 | Organ ........................ 600/547 |

FOREIGN PATENT DOCUMENTS

| WO | WO 98/23204 | 6/1998 |
| WO | WO 99/12470 | 3/1999 |

* cited by examiner

Primary Examiner—Ruth S. Smith
(74) Attorney, Agent, or Firm—Quarles & Brady LLP

(57) ABSTRACT

An electrical property imaging system includes an array of sensors placed around an object to measure the surface charges thereon as a sinusoidal voltage is applied thereacross. The resulting distribution of charges inside the object are calculated using a stored charge correlation matrix. Electrical property images are produced from the internal charge distribution image.

14 Claims, 9 Drawing Sheets

FIG. 4
PRIOR ART
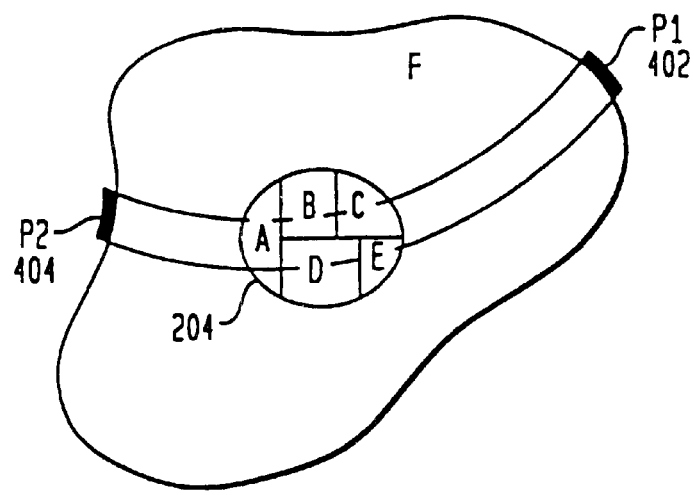
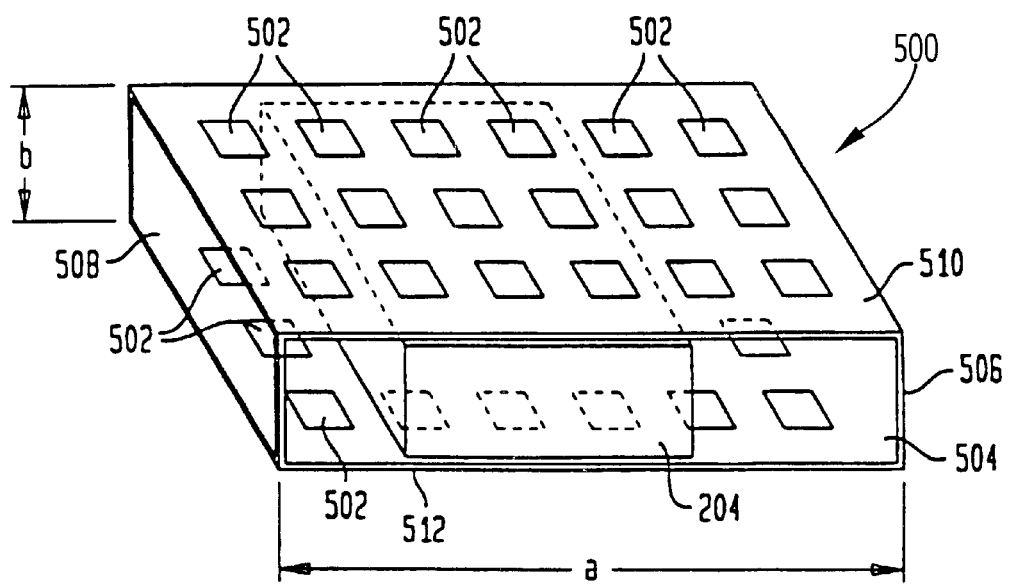
FIG. 5

METHOD AND APPARATUS FOR PRODUCING AN ELECTRICAL PROPERTY IMAGE USING A CHARGE CORRELATION MATRIX

RELATED APPLICATIONS

This application is based upon Provisional Application Ser. No. 60/221,465 filed on Jul. 26, 2000.

BACKGROUND OF THE INVENTION

This invention relates to electrical imaging technology, and more specifically to an apparatus and method for producing high resolution images, with accurate values of the electrical properties of the imaged object.

Since Roentgen discovered the ability of x-rays to produce a shadowgram of the interior of a sample, there has been a substantial interest in scientific and engineering circles in technologies that allow the imaging of the interior of a sample using quantities measured exterior to the sample. While these technologies are often applied in industry and commerce generally, one of the most active areas for the use of imaging technologies is in the field of medicine. The original shadowgram x-rays were enhanced substantially with the discovery and perfection of computerized axial tomography, which allows the recovery of not just a shadowgram, but detailed information about the interior structure of a sample from x-ray intensities measured on the outside. A similar intense interest developed when nuclear magnetic resonance measurements were extended to map the interior of a sample in what is now commonly called Magnetic Resonance Imaging (MRI). Also, the use of ultrasound to explore the interior of samples has been a technology that has received substantial interest.

For all of these technologies (x-ray tomography, MRI, and ultrasound), an accurate picture in terms of spatial resolution is produced. However, information about the character of various objects located in the interior of a sample is often very limited. For example, x-ray tomography measures only the intensity of absorption at a single x-ray frequency and is generally simply proportional to the density of the material of the sample. The only improvements to conventional x-ray tomography have been to use x-rays at different frequencies, which allow some information about both the density of objects in a sample (in terms of mass) as well as the electron density. Nonetheless, at best, only two new pieces of information are available from such measurements. MRI is a modality that is sensitive to other parameters. Primarily, MRIs measure the number of protons (usually associated with hydrogen atoms) at any given point in a sample. Some extra information can be obtained with a great deal of analysis and care by measuring the decay time for certain magnetic resonance properties, but the sensitivity is such that perhaps three parameters can be measured using this technique. A similar situation is obtained with ultrasound where there are yet some other complications due to the multiple reflections of the sound waves. While CAT scans and MRIs produce pictures that are somewhat familiar to even the untrained eye, ultrasound imaging requires a very skilled operator to perform the measurements and to interpret the results.

Because of the limitations of the existing imaging techniques, scientists and engineers have looked for other properties that might be exploited to produce an appropriate and improved image of the interior of an object. Techniques have been developed which measure the electrical properties of different materials located within an object. Such imaging has shown that substantial variations within a sample from one type of material to another may be detected (e.g., in a biological sample such as a human being, from one type of tissue to another) and provides a unique imaging modality that reveals information quite different from conventional imaging modalities.

Such electrical property imaging techniques are often referred to as "impedance tomography." Most conventional electrical property imaging techniques are based on the premises that: 1) electrodes, or sensors, should be attached directly to the sample to be measured (for medical applications, the sample is a human body), and 2) current is injected sequentially through each electrode into the sample and the subsequent voltages measured. Therefore, these conventional imaging techniques implement a "constant current/measured voltage" scheme.

In a departure from such conventional electrical property imaging techniques, one of the present inventors arranged sensors in an array outside the object to be measured as disclosed in U.S. Pat. No. 4,493,039. Further, during imaging of a sample, the ac voltages were applied at a fixed amplitude while the current was measured. This approach was further improved as described in pending patent application WO 99/12470 by filling the space between the object and the sensor array with an impedance matching medium. In addition, techniques for computing the internal charge distribution based on the measured surface charges are described, referred to as the scale factor technique and the iterative technique. Both the iterative and scale factor technique require initial estimates of the geometry of internal structures derived from an associated imaging system such as an x-ray CT system. The iterative technique also requires an initial guess of the electrical properties of each region, then uses a forward calculation of the expected currents at the boundary to check the validity of the guess, iterating this process until the guess produces boundary currents close to the measured values. The scale factor technique creates a "look up" table or neural net algorithm that allows one to correlate electrical properties or the interior of the sample with externally measured parameters using a large data set of model calculations. Because of limitations of the model and the need to extrapolate results to keep the size of the data sets reasonable, the scale factor technique has limited accuracy, but it does not require prior knowledge of approximate sample electrical properties. In fact, the results of the scale factor computation may serve as an initial estimate for the iterative technique. Both techniques are computationally intensive.

SUMMARY OF INVENTION

The present invention solves the problems associated with prior electrical parameter imaging techniques by providing an apparatus and method that generates an accurate image of the electrical properties of an object. More particularly, a charge correlation matrix is stored and employed during image reconstruction to directly calculate the internal charge distribution in the object from acquired surface charge measurements made on the object. From the calculated internal charge distribution, images of internal electrical properties such as conductivity and dielectric constants may be produced.

A general object of this invention is to produce high resolution images of internal electrical properties without the need for a separate imaging system. Charge correlation matrices are pre-calculated and stored in the apparatus for use with selected sensor array geometries and with prescribed image sizes and resolutions. The calculation of the internal charge distribution is a straight forward multiplication of the acquired surface charge data by the appropriate, stored charge correlation matrix. Electrical properties images are easily produced from the resulting internal charge image.

BRIEF DESCRIPTION OF DRAWINGS

FIG. 4 is a planar view of a closed volume in space being measured by a conventional electrical property imaging technique;

FIG. 5 is a three dimensional representation of a sample holder which is employed when practicing the present invention;

DESCRIPTION OF THE PREFERRED EMBODIMENT

Figure 1:
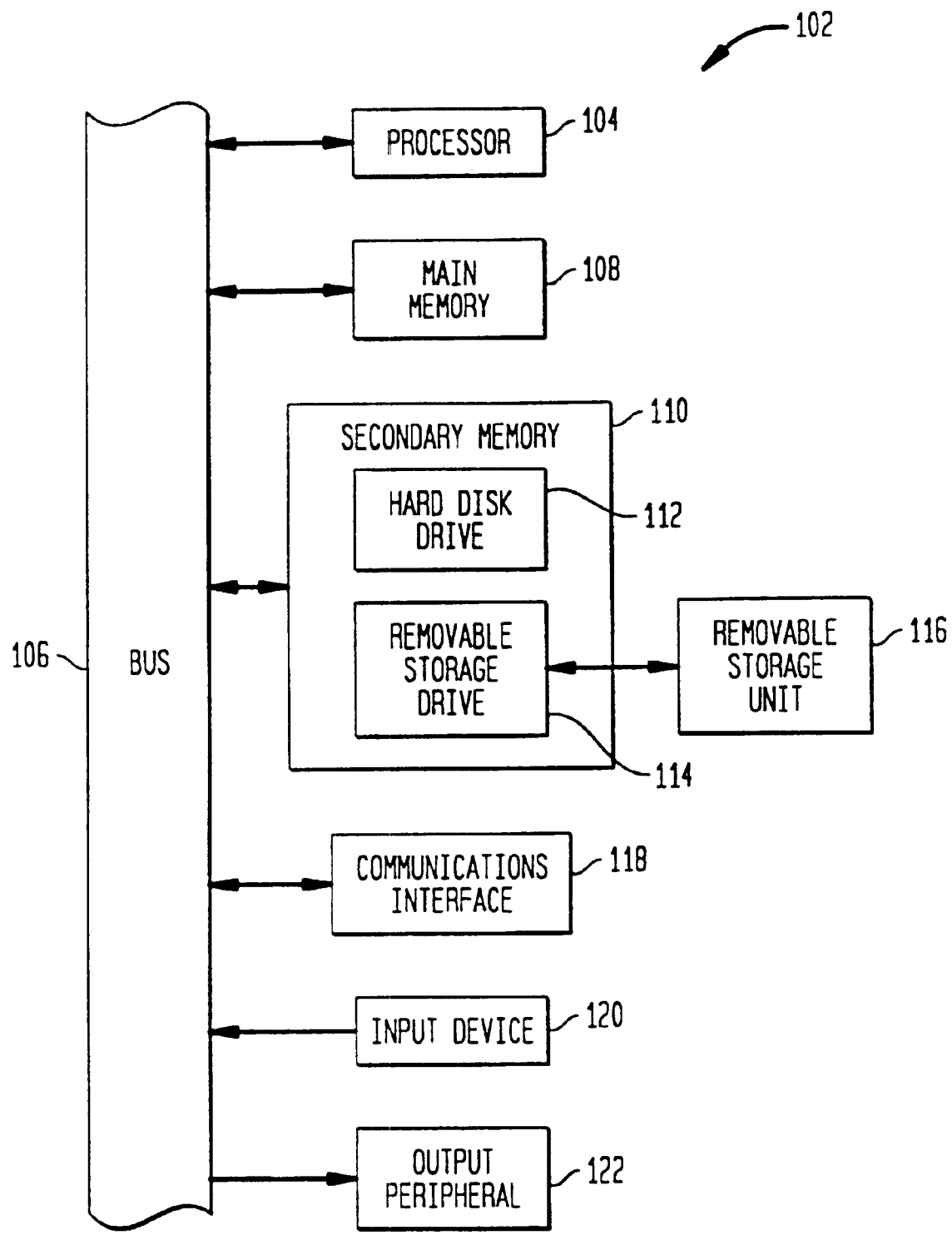
FIG. 1 is a block diagram showing an exemplary computer system useful for implementing the present invention.

The preferred embodiment of the invention is implemented in a programmed computer shown in FIG. 1. The computer system 102 includes one or more processors, such as a processor 104, connected to a communication bus 106. The computer system 102 also includes a main memory 108, preferably random access memory (RAM), and a secondary memory 110. The secondary memory 110 includes, for example, a hard disk drive 112 and/or a removable storage drive 114, representing a floppy disk drive, a magnetic tape drive, a compact disk drive, a program cartridge and cartridge interface (such as that found in video game devices), a removable memory chip (such as EPROM, or PROM), etc. which is read by and written to by a removable storage unit 116. The removable storage unit 116, also called a program storage device or a computer program product, represents a floppy disk, magnetic tape, compact disk, etc. As will be appreciated, the removable storage unit 116 includes a computer usable storage medium having stored therein computer software and/or data. The removable storage drive 114 reads from and/or writes to removable storage unit 116 in a well known manner.

The computer system 102 may also include other similar means for allowing computer programs or other instructions to be loaded. Such means can include, for example, a communications interface 118 which allows software and data to be transferred between computer system 102 and external devices. Examples of communications interface 118 include a modem, a network interface (such as an Ethernet card), a communications port, etc. Software and data transferred via communications interface 118 are in the form of signals which can be electronic, electromagnetic, optical or other signals capable of being received by communications interface 118.

In this document, the term "computer program product" refers to removable storage unit 116, a hard disk installed in hard disk drive 112, and signals transferred via communications interface 118. These computer program products are means for providing software to a computer system 102. In the preferred embodiment where the invention is implemented using software, the software may be stored in main memory 108, or in a computer program product and loaded into computer system 102 using removable storage drive 114, hard disk drive 112, or communications interface 118. Data structures such as the charge correlation matrices discussed below may be loaded and stored in the same manner. The software, when executed by the processor 104, causes the processor 104 to perform the functions of the invention as described herein. In an alternative embodiment, the invention may be implemented primarily in hardware using, for example, a hardwired state machine. Implementation of the state machine so as to perform the functions described herein will be apparent to persons skilled in the relevant arts.

The computer system 102 also includes an output peripheral device 122 and one or more input devices 120. The output peripheral device may be a computer screen or monitor on which a graphical user interface, including a windows environment, may be displayed. The input devices 120 include, for example, a keyboard, a mouse, a light pen, a pressure-sensitive screen, etc., which provide a user with the capability of entering input to the computer system 102.

Figure 2:
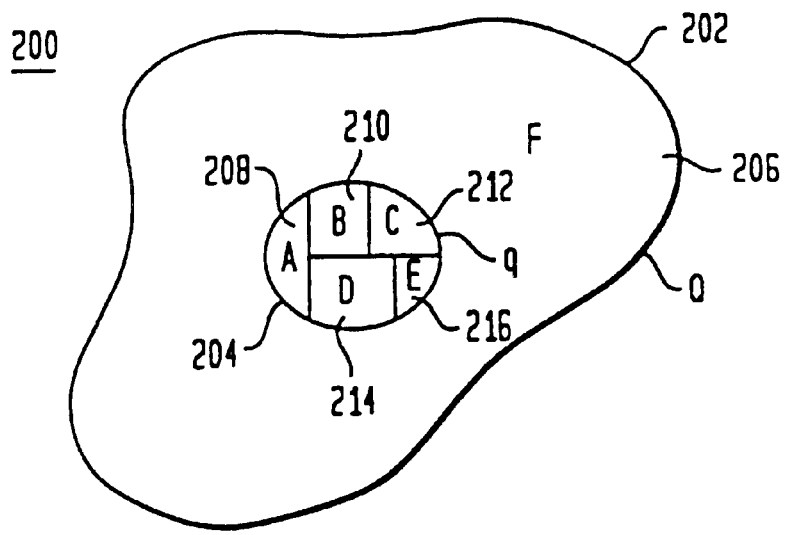
FIG. 2 is a planar view of a closed volume in space.

The underlying mathematical theory of the imaging technique of the present invention will now be described with reference to FIGS. 2–4. FIG. 2 is a planar view of a closed volume space 200 surrounded by a surface 202 that contains a sample 204 and an interior region F 206, such that region F 206 is the space between the sample 204 and the surface 202. The sample 204 comprises a plurality of connected subregions which for convenience are labeled: subregion A 208, subregion B 210, subregion C 212, subregion D 214, and subregion E 216. Each subregion 208–216 may be composed of a different material, such as different tissues in a human subject.

When an electromagnetic field at some specified frequency (f) is applied to the sample 204 in the closed volume space 200, a total charge is produced only where the electrical properties change, such as at the boundaries between each subregion 208–216 of the sample 204 where there is a dissimilarity in the dielectric constant and conductivity electrical properties of each subregion 208–216. These total charges will in turn induce a redistribution of the total charges on the surface of the closed volume space 200. It is assumed that these induced charge distributions result from both free charges (free to move individually) as well as polarization charges located on the surface 202 of the closed volume space 200. The charges on the surface 202 are also total (free plus polarization) charges wherein the total charge on a point on the surface 202 is indicated with a capital "Q", while the total charge on a point in the interior of the closed volume space 200 is indicated with a small "q." It is important to note that the measurement of the total charge Q can involve either an actual measurement of the charge Q or the charge Q as derived from a small increment of the electrical current, I, which is the rate of change of the charge Q with time.

The total charge Q at a point on the surface 202, and the total charge q at a point in the interior can be connected via electromagnetic theory. The fundamental theorem of electrostatics shows that an interior total charge q and a total charge Q on the surface 202 are uniquely related. However, when time varying electric fields are applied to electrical media they induce currents in the media. These currents in turn produce time varying magnetic fields that can induce electric fields in addition to the applied electric field via Faraday's law. This extra contribution to the electric field is negligible at low frequencies and can be ignored. We will use this so-called "quasi-static" approximation.

Figure 3:
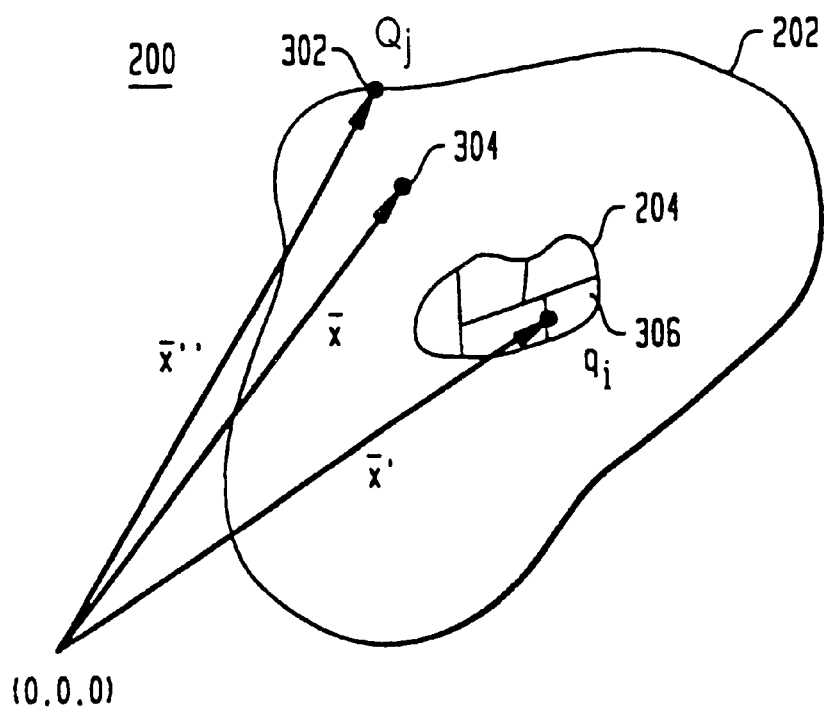
FIG. 3 is a planar view of a closed volume in space showing the relationship between the measured exterior total charges $Q_j$ and the interior total charges qi.

FIG. 3 is a planar view of the closed volume space 200 showing the relationship between the total charge Q at a point on the surface 202 and a total charge q at a point in the interior that are connected via The Greens Function. Specifically, The Greens Function connects a total charge Q on the surface 202 at point j with an interior total charge q at point $$q_i \leftrightharpoons Q_j$$

This relationship provides the desired information about the electrical properties of the interior subregions 208–216 of sample 204. FIG. 3 illustrates the coordinate system and some of the relevant geometry used in this discussion. The notation used in the coordinate system for the field point 304, the source point 306 and surface point 302 are $\overline{X}$, $\overline{X}$ prime ($\overline{X}'$) and $\overline{X}$ double prime ($\overline{X}''$) respectively. By associating the total charges q inside the sample 204 at the source point 306 with the total charges Q at the surface point 302, an enhanced image of the interior of the sample 204 can be generated. Therefore, the position at which the electric field is measured is field point 304.

The imaging technique of the present method differs significantly from the conventional electrical property imaging techniques. FIG. 4 is a planar view of a closed volume space 200 being measured by such conventional imaging techniques. A network of lumped circuit elements represents the electrical properties of the sample. With such a method, currents are injected at known places, e.g., P1 402, on the surface 202 of the closed volume space 200 and extracted at known places, e.g., P2 404. The voltages on the surrounding sensors are then measured and the lumped circuit impedances are computed from the set of current-voltage measurements. In contrast, the technique of the present invention allows one to fully describe the wave-like nature of the electric fields in the closed volume space 200 and the measuring volume and does not require any specific assumption regarding the structure of a lumped circuit element network or of the equivalent circuits used to characterize the subregions 208–216 of the sample 204 being measured.

Applying the Maxwell Equations of electromagnetic theory to the problem as just described results in Equation 1A:

$$\nabla \cdot [(\sigma + j\omega\varepsilon_0\varepsilon_r)(-\nabla\Phi)] = 0 \qquad (1A)$$

Where:

$\sigma$ = conductivity $\varepsilon_r$ = relative dielectric constant $\varepsilon_0$ = dielectric constant of free space $\Phi$ = potential.

In addition, a standard result of electromagnetic theory is the connection between the potential, ($\Phi$)), and the total charge density, $\rho$, known as the Poisson Equation, Equation 1B:

$$\nabla^2\Phi = \frac{\rho_{Total}}{\varepsilon_0} \qquad (1B)$$

where $P_{Total}$ is the volume total charge density. The electric field E is obtained from the following equation:

$$\overline{E} = -\nabla\Phi \qquad (1C)$$

The Equations 1A and 1B show that for determining the electric field E and the scalar potential phi ($\Phi$), the charge densities that are important are related to the total charge, i.e., the free charge plus polarization charge.

Other methods for imaging the electrical properties attempt to compute the dielectric constant and conductivity of each region directly from the measurements. In the current invention we compute the total internal charges as an intermediate step. One advantage of seeking the charges rather than going directly for the conductivity or dielectric constant is that the internal charges, which totally govern the electrical picture, appear essentially only at boundaries that exist at discontinuities within the object, thus there are far fewer values to compute. Equation 2 below shows this since the gradient of the conductivity and the gradient of the dielectric constant contribute to the total charge density. Therefore, total charge depends on the rate with which the conductivity and the dielectric constant change with distance.

$$\rho_{Total} = \frac{[\nabla\sigma + j\omega\nabla(\varepsilon_0\varepsilon_r)] \cdot \nabla\Phi}{\sigma + j\omega\varepsilon_0\varepsilon_r} \qquad (2)$$

A standard theorem in electromagnetic theory is the Uniqueness Theorem. The Uniqueness Theorem for the quasistatic case states that if the potential or its normal derivative is known on a surface surrounding a closed volume, then the potential at a field point 304 can be uniquely determined. It is important to note that either the potential or the normal derivative of the potential need be known but not both. In fact, the problem would be over determined if both were known. While it is possible to define the problem with the potential known on some portion of the bounding surface and the normal derivative on other portions, Equation (3) below considers the simple case where the potential on the surface 202 is known. This is known as the Dirichlet boundary condition.

Equation 3 is the solution to Poisson's Equation (Equation 2) using the Green's Function.

$$\Phi(\overline{X}) = \frac{1}{4\pi\varepsilon_0}\int \rho_{Total}(\overline{X}') \cdot G_D(\overline{X}, \overline{X}')d\tau - \frac{1}{4\pi}\oint \Phi(\overline{X}')\frac{\partial G_D(\overline{X}, \overline{X}')}{\partial n'}dS \qquad (3)$$

Where $G_D$ is the Dirichiet Green's Function, d$\tau$ is an element of volume and S is an element of surface surrounding the volume $\tau$. The first term in this equation is an integral over the entire volume and the second term is an integral over the surface of that volume.

Equation 3 is the potential at the field point 304 as determined by the total charge q on the interior and the potential on the surface 202, exactly as the Uniqueness Theorem predicts. The solution is obtained in terms of a geometrical function, the Green's Function, which is a standard treatment. When a sample 204 is present, both the volume integral of the total charge density $\rho_{Total}$ and the surface integral of the potential $\Phi$ are present. If the same potential distribution on the surface is considered but with no sample present, then the charge density term is zero but the surface integral term remains the same. The surface term (the second integral in Equation 3) is unchanged by inserting the sample 204 because the voltage is set to pre-determined values on the surface 202 and kept at those values before and after inserting the sample 204. Because of this, when the two terms are subtracted, the remaining expression involves only the Green's Function (which is a known quantity for a given shape of the array of measuring sensors) and the charge density. Therefore, it is convenient to use the difference in the potential between the case when a sample 204 is inserted and when a sample 204 is not inserted between the sensors. This potential difference can be related to the charges at the surface 202 by taking the normal derivative of the potential difference, which produces the normal component of the electric field since By Gauss's law, the normal component of the field near a conducting surface is directly proportional to the charge per area on that surface.

The above continuum model of the relationship of surface charge Q to the internal charge q can be expressed as the sum of measured discrete charges set forth below in equation (4). Equation (4) shows that those charges $Q_j$ at the surface 202 labeled by the index "j" will be related to the charges $q_i$ on the interior labeled by the index "i" by a matrix element involving both "j" and "i" wherein the connecting matrix element is simply the normal derivative of the Green's Function:

$$\Delta Q_{jTotal} = Q(j)_{Total}^{Full} - Q(j)_{Total}^{Empty} = \sum_i \frac{\partial G_D(j, i)}{\partial n''_j} \cdot q_i \quad (4)$$

Equation 5 below shows that this series of equations in "j" can be written down and grouped together in matrix formulation involving a charge on the surface 202 as a vector, with each term of the vector one of the total charges. For the charges on the surface 202, a capital "Q" is used and they are related to a similar vector for which each term is one of the total charges on the interior using the small "q."

$$\overline{\Delta Q} = \overline{\frac{\partial G_D}{\partial n''}} \cdot \overline{q} \quad (5)$$

This series of equations is inverted to give the charges on the interior, "q", provided that the matrix itself has an inverse. More specifically, if an inverse exists, when the Green's Function derivative matrix is multiplied by its inverse, a unit matrix results as shown in equation (6).

$$\overline{\frac{\partial G_D}{\partial n}} \cdot \overline{\left(\frac{\partial G_D}{\partial n}\right)^{-1}} = I = \begin{pmatrix} 1 & 0 & \cdots & \cdots & 0 \\ 0 & 1 & 0 & \cdots & \cdots \\ \cdots & 0 & 1 & 0 & \cdots \\ \cdots & \cdots & \cdots & \cdots & \cdots \\ 0 & \cdots & 0 & 0 & 1 \end{pmatrix} \quad (6)$$

FIG. 5 is a three dimensional representation of a sample holder 500 having a sample 204 contained therein. A plurality of sensors 502 are arrayed on each side of the sample holder 500 in a matrix configuration. This three-dimensional implementation of the invention is preferred, however, in the following discussion a two dimensional implementation is described. We will continue further development of the theory for this imaging method using the sensors in a two dimensional cross-section through the sample holder 500. This is shown best in FIG. 6. The resulting 2D sample holder apparatus 600 includes two opposing rows of sensors spaced apart by a distance b and extending along a length a, and two opposing rows of sensors spaced apart by distance b and extending along length a. The preferred embodiment of the present invention is described in terms of a rectangular sample holder. It would be readily apparent to one of ordinary skill in the art to use a sample holder of a different geometric cross-sectional shape. However, when such a new shape is used, the sine function used to generate the Fourier transform values (to be described below) would be replaced by a function chosen from an appropriate orthonormal set of functions particular to the new shape of the sample holder.

A sample 204 is placed inside the sample holder 500 with a matching medium 504 that matches the impedance between the sample 204 and the sensors 502. More specifically, the matching medium 504 matches the average impedance of the entire sample 204. The sensors 502 are any sensing element that can be probed to determine the electric charge deposited on the sensor. Each sensor 502 serves the dual purpose of providing a controlled voltage to the sample 204, thereby generating the electromagnetic field, and of measuring the resulting electrical current, or total charge Q, over a fixed time interval.

It is possible to acquire sufficient charge data to reconstruct an image with a single orientation of the subject and applied electric field E. However, the signal to noise ratio (SNR) can be significantly improved if multiple measurements are made. By applying a sinusoidal potential of constant amplitude A1 across the top 510 of the rectangular space 500, and a similar potential of a different amplitude A2 on the bottom 512 of the rectangular space 500, with similar potentials having an amplitude varying continuously from A1 to A2 on equivalent portions of surfaces 506 and 508, a uniform electric field E is produced in the object in the vertical direction. Similarly a uniform electric field E is produced in the horizontal direction by reversing the roles of surfaces 510 and 512 with 506 and 508. The object can also be rotated with respect to the sample holder 500 to provide four possible combinations of sample 204 direction and electrical field direction. These four possible measurement conditions are set forth in TABLE 1.

TABLE 1

| Orientation (OR) | Sample Direction (S) | Electrical Field Direction (E) |
| --- | --- | --- |
| 1 | ↑S | ↑E |
| 2 | ↑S | →E |
| 3 | →S | ↑E |
| 4 | →S | →E |

Sample 204 orientations can be changed by rotating the plates of the sample holder or by rotating the sample 204 itself. Such rotation can be achieved by hand or by an automated means. From these four orientations, fifteen combinations of the resulting acquired data can be made. These fifteen possible combinations of field direction and sample orientation are set forth in TABLE 2.

TABLE 2

| Combination | Orientations |
|---|---|
| 1 | 1 |
| 2 | 2 |
| 3 | 3 |
| 4 | 4 |
| 5 | 1, 2 |
| 6 | 1, 3 |
| 7 | 1, 4 |
| 8 | 2, 3 |
| 9 | 2, 4 |
| 10 | 3, 4 |
| 11 | 1, 2, 3 |
| 12 | 1, 2, 4 |
| 13 | 1, 3, 4 |
| 14 | 2, 3, 4 |
| 15 | 1, 2, 3, 4 |

The total charge $Q_j$ on the surface 202 is measured by measuring the current as a function of time, $I(t)$, setting the charge on each sensor equal to zero at time $t=0$ and computing the total charge by integrating the current over time from $t=0$ to the desired time $t$. For example, when the current is determined from the phase sensitive detector measurements to have an amplitude A and phase $\alpha$ for a sine wave time dependence ($I_j(t)=A\sin(\omega t+\alpha)$) the total charge is given by $$Q_j(t) = \int_0^t I(t)dt = Q_j(0) - (1/\omega)A\cos(\omega t + \alpha) \quad (6A)$$

Equation 7 below shows how to get rid of the double sum that is going to appear in the expression for the total charge $Q_j$ on the surface 202 of a sample 204. Once the Green's Function is expanded in a complete set of orthogonal functions (which is just the sine function), the result is a sum over the parameter "L" which appears inside the sine function in Equation 7 and also a sum over the charges $q_i$ which appear in Equation 4. Multiplying by the appropriate sine function for given value "L", and summing up over the top side 510 or the bottom side 512, results in the elimination of the sum over "L", thereby leaving just one term remaining. This result occurs because of the orthogonality property of sine and cosine functions. The accuracy can be further improved by adding the results from the top 510 and bottom 512, resulting in the equation for a given value of "L" for the Fourier Transform (the sine transform) as shown in Equation 8.

$$FT(L) = \int_0^a [\Delta Q_{Top}(x) - \Delta Q_{Bottom}(x)] \cdot \sin\left(\frac{L \cdot \pi \cdot x}{a}\right) dx \quad (7)$$

$$FT(L) = \frac{|\Delta S|}{\pi^2} \sum \frac{\sin\left(\frac{L \cdot \pi \cdot x_i'}{a}\right) \cdot \cosh\left(\frac{L \cdot \pi \cdot \left(\frac{b}{2} - y_i'\right)}{a}\right)}{\cosh\left(\frac{L \cdot \pi \cdot b}{2a}\right)} \cdot q_i \quad (8)$$

For each value of "L", one equation can be produced each of which involves the sum over the charges labeled by "i," the matrix elements of which are shown in Equation 8. This set of equations becomes somewhat better conditioned, i.e., one equation differs more from the other, if the length of the small side "b" is small compared to two times the length of the long side "a." Nonetheless, highly accurate results can be obtained for a=b.

We have discovered that it is possible to actually solve these equations (8) rigorously and produce an exact minimum noise solution to the problem, and thus to produce an accurate representation of the charges q in the interior of the object. Once this has been done, the interior charge distribution image can be used to build the solution for the potential everywhere on the interior of the object using the known Green's Function Solution presented in Equation (3) above. Once the potential everywhere on the interior of the object is known, the electrical fields can be easily generated from those potentials using Equation (1C). One can then obtain the change in the electrical field as you go from one point in the interior to another, which then produces an estimate of the electrical properties at every point in the interior of the object.

Equation (8) is an expression for the electric charge if one adds the Fourier transforms for the surface charges measured along a row of detector elements disposed on opposite sides of the object. The coordinates x' and y' are the location of the internal charge q, where x' is along the direction of the row of opposing detector elements and y' extends perpendicular to and between the two rows of opposing detector elements. The functional dependence on the position of the interior charge q in the direction parallel to the measuring plates (x') is a trigonometric sine function. Each sine function is indexed by an integer L, where L can vary from one to an arbitrarily high number n. In this preferred embodiment n is set equal to twice the number of pixels desired in the prescribed image (i.e., twice the number of interior charge points $q_i$).

We also note that expressing these equations in vector matrix notation produces a matrix (which we call M (L,i)) where each row of the matrix is perpendicular to every other row because of the orthogonality property of the sine functions.

$$FT(L) = \sum_i M(L, i) \cdot q_i \quad (9)$$

Where:

$$M(L, i) = \frac{|\Delta S|}{\pi^2} \cdot \frac{\sin\left(\frac{L \cdot \pi \cdot x_i'}{a}\right) \cdot \cosh\left(\frac{L \cdot \pi \cdot \left(\frac{b}{2} - y_i'\right)}{a}\right)}{\cosh\left(\frac{L \cdot \pi \cdot b}{2a}\right)}$$

It is possible using standard theorems of matrix theory to show that the columns of the matrix are also orthogonal provided that the rows are "normalized". (To normalize, take the vector dot product of each row with itself, take the square root of the number that's produced and divide each element in the row by the square root.) But if the columns of the matrix are orthogonal, then the entire matrix is an "orthogonal matrix". The inverse of the matrix is just its transpose (where the rows and the columns are interchanged) and this means that the desired inverse of equations (8) are a straightforward calculation.

To test this, we normalized the rows of the matrix $\overline{M}$ and we then further took the matrix dot product of the transpose of that matrix $\overline{M}^T$ with the original.

$$\overline{M}^T \cdot \overline{M} = \overline{D} \quad (10)$$

Figure 11:
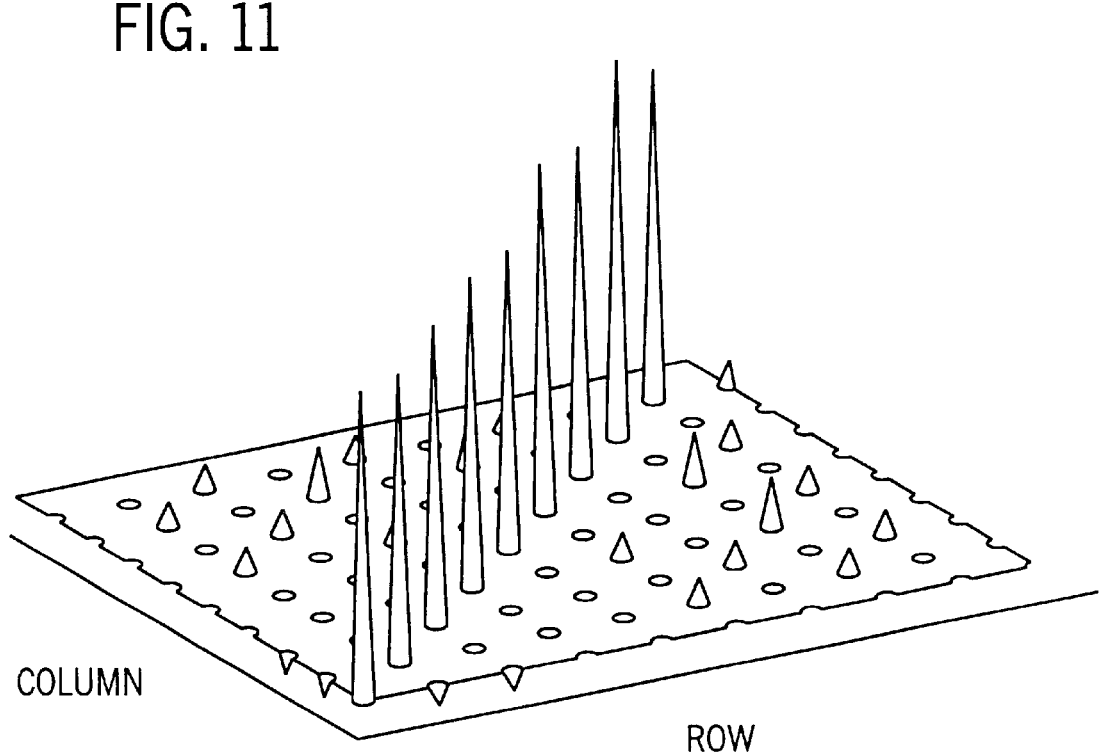
FIG. 11 is a pictorial representation of a diagonal matrix.

The results are shown in FIG. 11. The vertical axis represents the value of the matrix $\overline{D}$ element, and the two horizontal directions represent the row and the column number from which that element is taken. We note that the resulting matrix $\overline{D}$ is substantially diagonal; i.e. the non-zero elements are along the diagonal of the matrix. When matrix $\overline{D}$ is multiplied by the vector representing the internal charges ($\overline{q}$), only one of those charges is picked out for multiplication of each row.

$$\overline{M}^T \cdot \overline{FT} = \overline{M}^T \overline{M} \cdot \overline{q} = \overline{D} \cdot \overline{q} = \begin{bmatrix} D_{11} & 0 & 0 & \cdots & 0 \\ 0 & D_{22} & & & 0 \\ 0 & & D_{33} & & \vdots \\ \vdots & & & \ddots & 0 \\ 0 & 0 & \cdots & 0 & D_{ii} \end{bmatrix} \cdot \overline{q} \quad (11)$$

so that $q_i = \sum_L M^T(L, i) \cdot FT(L) / D_{ii}$

Algebraically, equation (11) is an expression for each separate internal charge $q_i$. All of the factors needed for this computation can either be measured or computed, and thus each element of charge $q_i$ in the interior of the object can be calculated separately. The matrix $\overline{M}^T$ is referred to herein as a "charge correlation matrix", and by calculating and storing the elements of this charge correlation matrix prior to image acquisitions, the reconstruction of electrical property images from acquired surface charge data is a relatively simple procedure.

An advantage of the present invention is that the charge correlation matrix can be determined for a given set of measuring plates and image resolution, and stored in the computer ahead of time. It is contemplated that a plurality of charge correlation matrices will be stored in system memory. One of these matrices will be selected based on the particular sample holder configuration used and the particular image prescription chosen. To evaluate the charges on the interior, therefore, we need only measure and produce the Fourier transforms of the measured surface charges Q. The process of inverting the data to produce the interior charges q is merely a matter of multiplying the transformed charge data by the selected charge correlation matrix. There is no iterative process and there is no need to make an initial guess at the magnitude of the electrical properties of each structure in the interior. Most importantly, it is also not necessary to make a measurement of the shape of the interior structures using a separate imaging system.

The final steps in taking the interior measured charges and producing the potentials and/or electrical fields on the interior of the object can be accomplished by inserting the charges q into the Greens' functions solution Equation (3). We note that there are two terms in the expression for the interior electrostatic potentials: A) a volume integral involving the charges q that were just calculated above; and B) an integral over the surface involving known potentials that are set at the surface. The first integral is obtained just using the charges calculated above. The second integral is obtained just as easily, because the potentials that are set at the surface sensors are determined by the experimenter and are known. Therefore everything is know and can be calculated by a simple plug-in operation and known formula to get the interior potentials according to equation (3).

Once the interior potentials are known, the electric field everywhere can be obtained from the rate of change of the potential in each direction as given in Equation (1C). Once the electric fields are known everywhere in the interior the electrical properties ($\epsilon_r$ and $\sigma$) of each region within this object can be computed from the change of the normal component of this electric field across each boundary within the object. Therefore, by starting with the known electrical properties of the medium surrounding the object, the electrical properties of adjacent regions in the object can be calculated. At each boundary of region(k) to region (k+1) the ratio of the normal components of the electric fields are related to the electrical properties in regions (k) and (k+1) as follows:

$$\frac{\overline{E}(k)_{normal}}{\overline{E}(k+1)_{normal}} = \frac{(\sigma(k+1) + j\omega\varepsilon_0\varepsilon_r(k+1))}{(\sigma(k) + j\omega\varepsilon_0\varepsilon_r(k))} \quad (12)$$

Since the values of $\sigma$ and $\epsilon_r$ are known for the matching medium (the region with k=1), use of Equation (12) will yield corresponding values for the next region (k=2). Applying the equation again for the boundary between region 2 and 3, we get the values for region 3, and so on until we have the electrical properties of the entire object.

Figure 6:
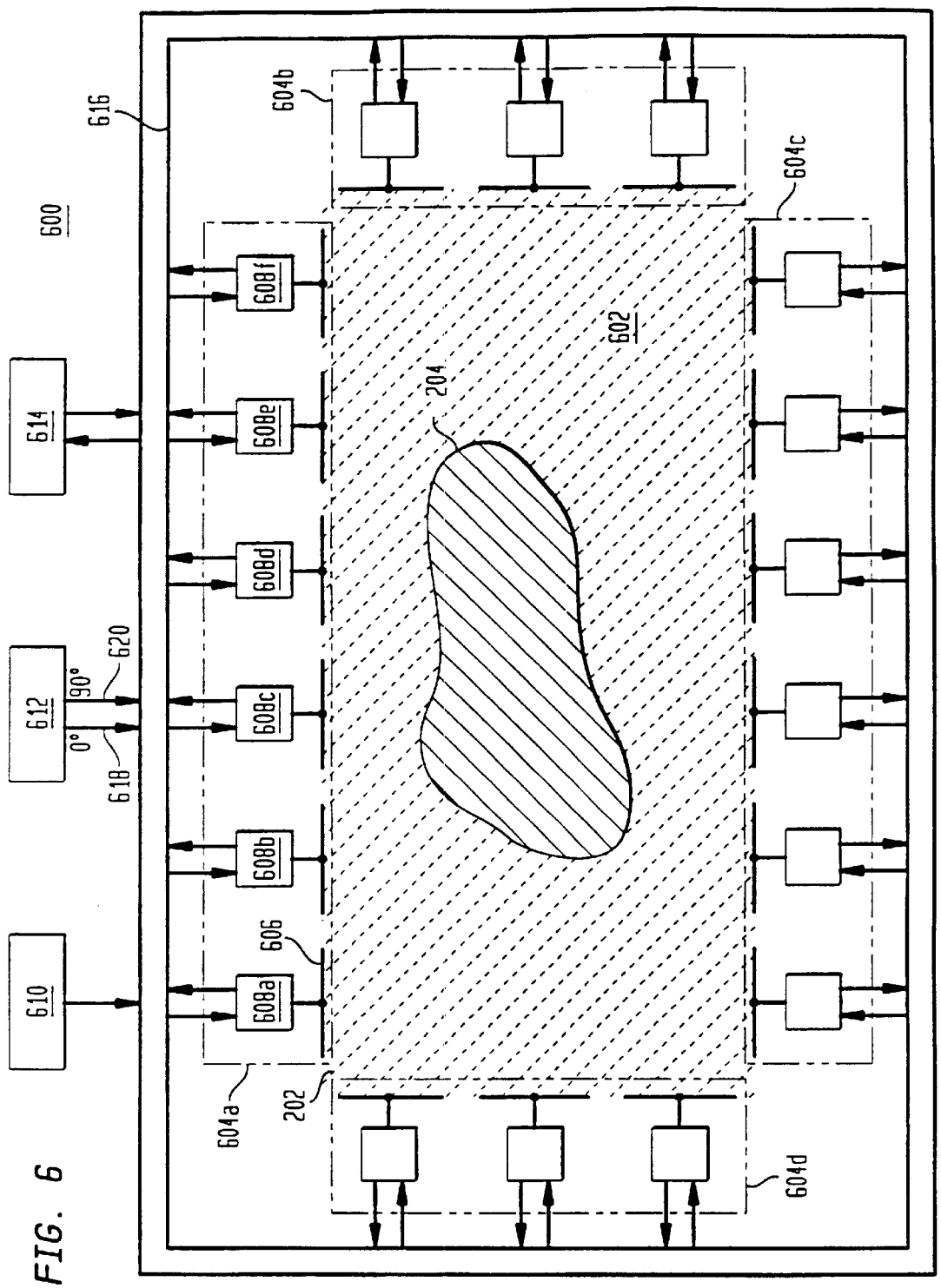
FIG. 6 is a block diagram showing an apparatus which is employed when practicing the present invention.

FIG. 6 is a block diagram showing an apparatus 600 which is employed to practice the present invention with a sample 204. In the preferred embodiment, the apparatus 600 comprises a capacitive sensor array 604a–d on each side of the sample 204 for detecting the point total charges Q at each point on the surface 202 of the sample 204. Specifically, there is a top array 604a, right side array 604b, bottom array 604c, and left side array 604d, which collectively form a sample holder 500. Therefore, the surface 202 of the sample 204 is the surface of the capacitive sensor arrays 604a–d (the sample holder 500). When the sample 204 is thick, the preferred embodiment comprises at least two capacitive sensor arrays 604a, c. However, it would be readily apparent to one of ordinary skill in the art to use an apparatus and method of the present invention using one or more such capacitive sensor arrays 604 for detecting the total charges Q at the surface 202 of a sample 204.

In operation, which is described in greater detail below, a sample 204 is placed between the capacitive sensor arrays 604a–d with two sides of the sample 204 being reasonably close to the capacitive sensor arrays 604a–d and with a matching medium 602 applied around the sample 204 as a buffer between the sample 204 and the capacitive sensor arrays 604a–d. Enough matching medium 602 is used to fill up the remainder of the sample holder 500 surrounding the sample 204. This preferred embodiment of matching medium 602 minimizes error in reading the total charges of the sample 204. A matching medium 602 is used to produce appropriate total charges Q at the segmented sensor plate 606 (which is equal to the surface 202 of the sample 204). Specifically, a matching medium 602 is chosen for a sample 204 such that the medium 602 optimizes the accuracy of the resulting dielectric constant and conductivity of each sub-region 208–216 of the sample 204.

Each capacitive sensor array 604a–d comprises an identical structure. For the purpose of convenience only, one capacitive sensor array 604a is described, however, the description is equally applicable to the other capacitive sensor arrays 604b–d of the present invention. A capacitive sensor array 604a comprises a segmented sensor plate 606 having a plurality of controller units 608a–f applied thereon and arranged in a matrix format. Each controller unit 608a–f applies the desired voltage to the sample 204 at a desired frequency, thereby generating an electromagnetic field, as well as detecting the total charge Q at the segmented sensor plate 606. A controller unit 608a is described below in greater detail.

A power supply 610, frequency source 612, and a computer system 614 are connected to the capacitive sensor arrays 604a–d by a bus 616. The power supply 610 provides the necessary DC power for the components of the sensor array 604 and the frequency source 612 provides the necessary alternating voltage to the capacitive sensor arrays 604a–d for measuring the sample 204 contained therein. In the preferred embodiment, the frequency source 612 provides both a zero degree component 618 (in-phase) and a ninety degree component 620 (quadrature phase) of the alternating voltage being output from the controller units 608a. Further, the frequency can be changed so that the apparatus 600 can make multiple frequency measurements as needed. When imaging tissues, for example, frequencies ranging from 100 Hz to 100 MHz may be employed to exploit the differences in electrical characteristics between various tissue types. The computer system 614 controls the components of the apparatus 600 and performs the calculations needed to generate the dielectric constant and conductivity electrical properties of the sample 204.

Figure 7:
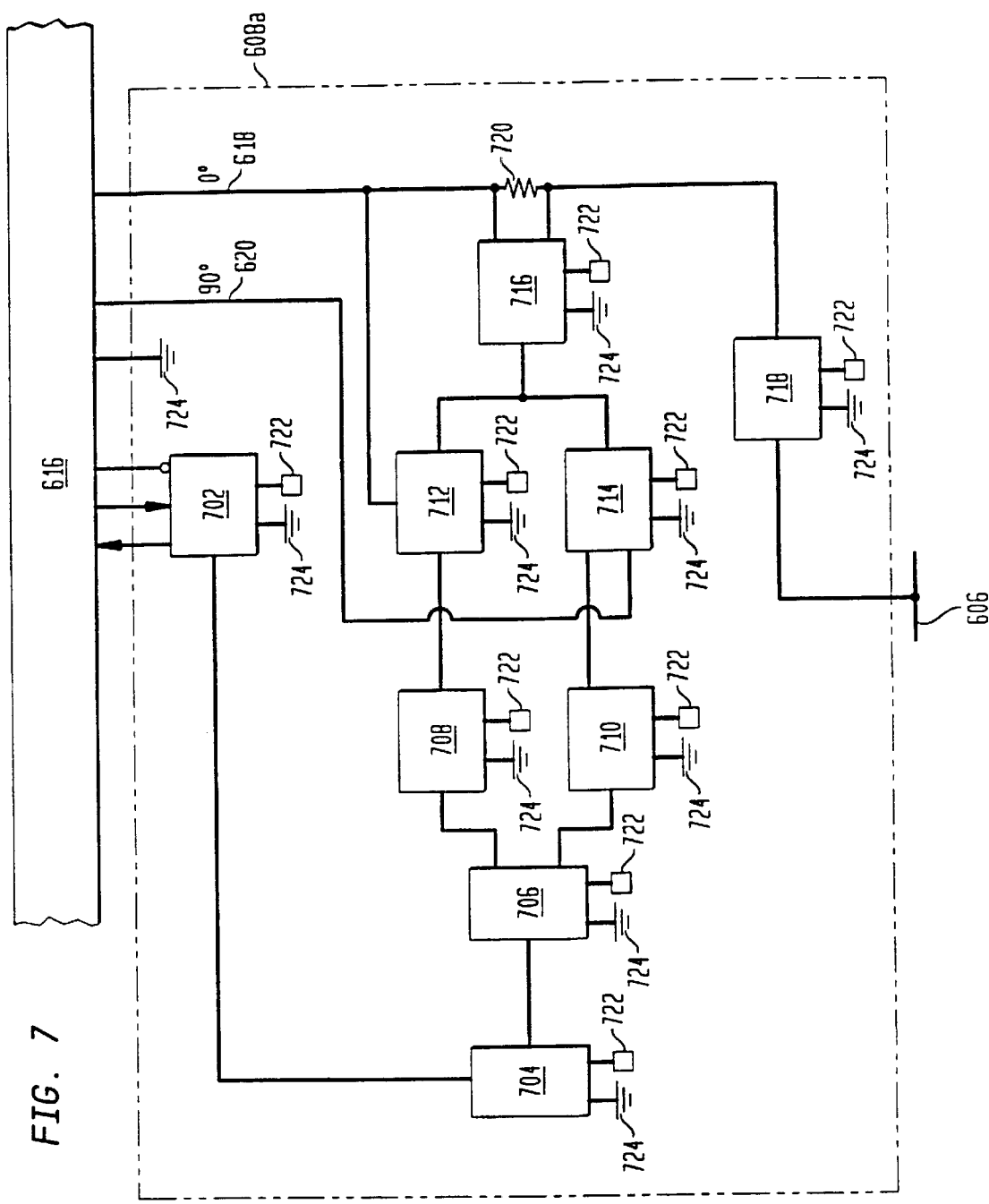
FIG. 7 is a block diagram showing a controller unit of the apparatus of the present invention.

FIG. 7 is a block diagram illustrating the structure of a controller unit 608a of a capacitive sensor array 604a. For convenience purpose only, one controller unit 608a is described, however, the description is equally applicable to the other controller units 608b–f. In the preferred embodiment, controller unit 608a comprises multiple components, including but not limited to, a local controller 702, an A/D converter 704, a multiplexer 706, a first Sample/Hold (S/H) component 708, a second S/H component 710, an out-of-phase phase (90 degree)phase sensitive detector 712, an in-phase phase (0 degree)phase sensitive detector 714, an auto-gain controller 716, a segment voltage controller 718, and a pure resistor 724. These components communicate via a local digital bus 722. Further, these components communicate with the other parts of the apparatus 600 via the bus 616. More specifically, the controller unit 608a transmits and receives data to/from the computer system 614, receives power 724 from the power supply 610, and receives in-phase and out-of-phase alternating voltage from the frequency source 612 over the bus 616. In operation, the computer system 614 commands the segment voltage controller 718 of 25 the controller unit 608a to set a given alternating voltage at a specified frequency. The pure resistor 724 is used to create a voltage that is an accurate measure of the magnitude and phase of the electrical current. Also, the computer system 614 engages the auto-gain controller 716 to maximize the voltage on pure resistor 724 reflective of the electrical current, or charge, inputted to the phase sensitive detectors 712, 714. Next, the computer system 614 commands the in-phase phase sensor detector 712 and the out-of-phase phase sensor detector 714 to read the total charges Q on the segmented sensor plate 606. The controller unit 606 transmits these total charges Q to the computer system 614 via the first S/H 708, the second S/H 710, the multiplexer 706, the A/D converter 704 and the local controller 702. These components operate using conventional methods. It should be readily apparent to one of ordinary skill in the relevant arts to convert the analog format of the total charges Q to digital values and then transmit these digitized total charges Q to the local controller 702 and the computer system 614 for further processing.

While we have described an embodiment using phase sensitive detectors to determine the amplitude and phase of the current at each sensor, it will be readily apparent to one skilled in the art that there are alternate methods to perform this task. For example, the current data could be digitized and the resulting digital signal could then be analyzed with a Fourier Transform Analyzer. This alternate method would be useful for creating images at several frequencies of the applied field simultaneously, thus saving time compared to the use of phase sensitive detectors, where the frequency would have to be changed sequentially for each sensor if only one set of quadrature phase sensitive detectors were to be employed for each sensor.

The apparatus 600 may be incorporated into a standard tomographic device, e.g., an x-ray CT or MRI system. This combination allows the imaging system to produce a high resolution image that may be registered with the image produced by the apparatus 600. However, it is an advantage of the present invention that high resolution images of the electrical properties of the subject can be produced without input from a separate imaging system.

Figure 8:
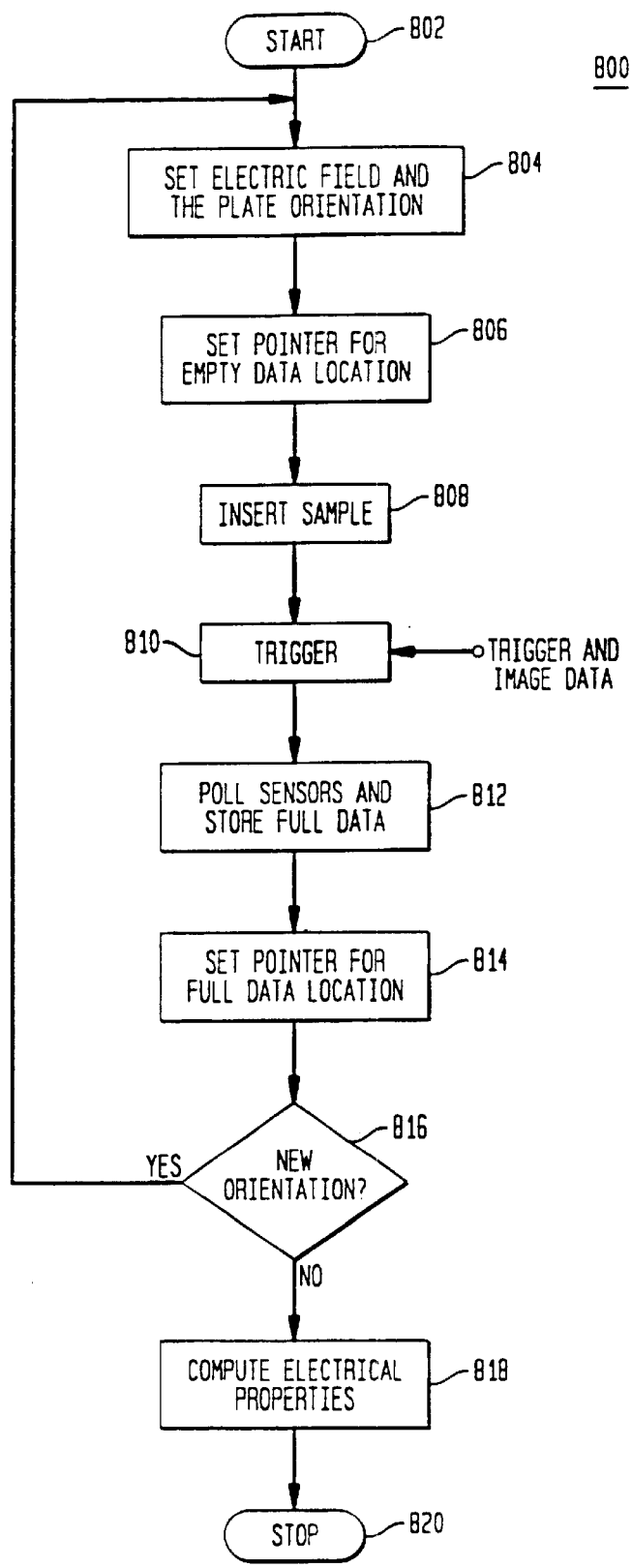
FIG. 8 is a control flow diagram showing the operation and method of the apparatus.
Figure 9:
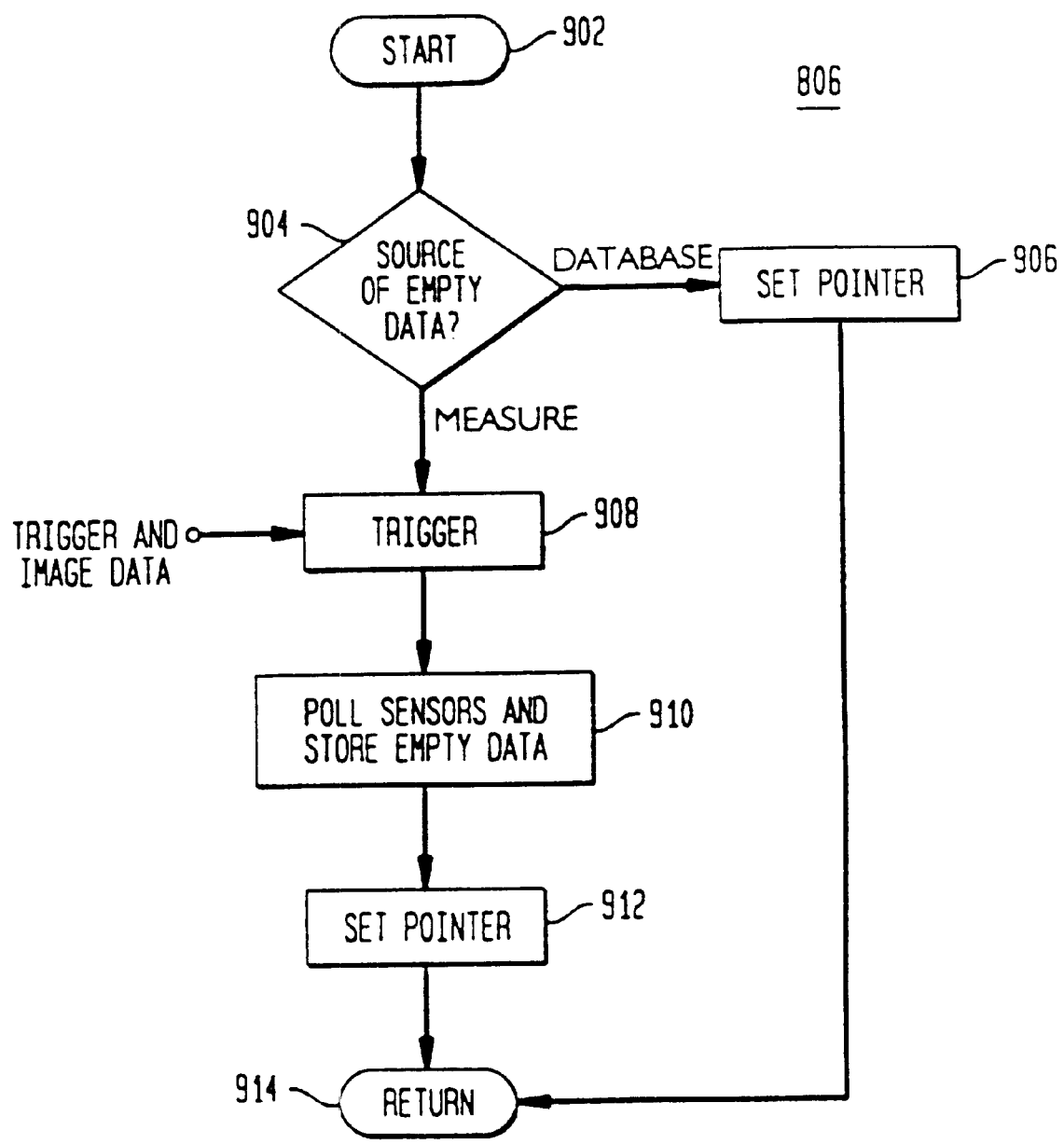
FIG. 9 is a control flow diagram showing the production of an empty data set for use in the process of FIG. 8.
Figure 10:
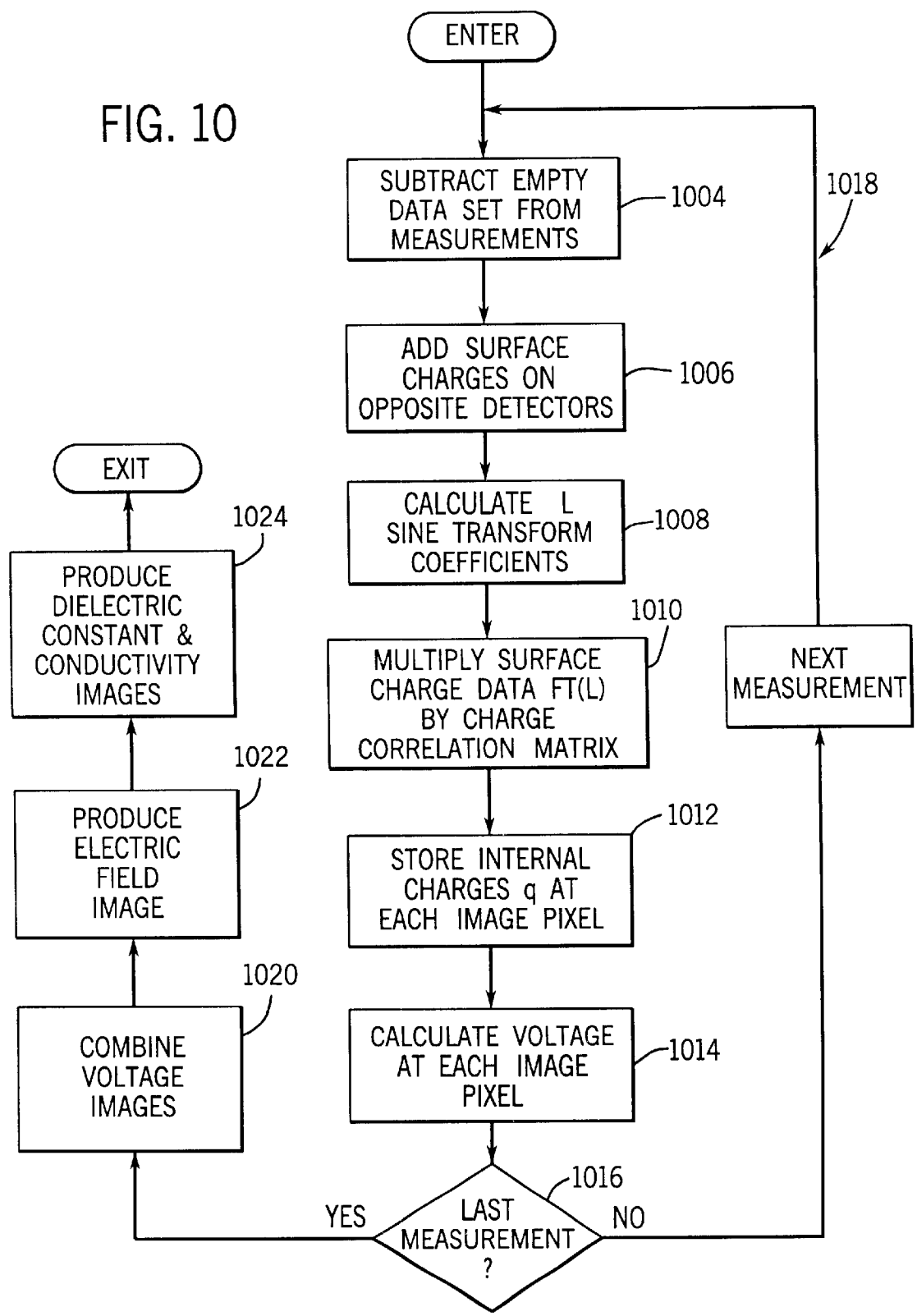
FIG. 10 is a control flow diagram showing the generation of final measurements of electrical properties for use in the process of FIG. 8 using the preferred embodiment of the present invention.

FIGS. 8–10 are flow charts illustrating the operational control of the apparatus 600. Referring to these figures, the method of using the apparatus 600 with a standard imaging system 620 is described below in detail. It can be appreciated, however, that this apparatus 600 can also be operated in a stand-alone mode. Control starts at step 802 at which the computer system 614 inputs initial start-up data, including but not limited to, a source indicator for empty data values, and the orientation of the sample 204 in the sample holder 500. As indicated above, a plurality of pre-calculated charge correlation matrices are stored in memory and as part of the initialization process, one of these is selected. This selection is made based on the particular image acquisition parameter prescribed by the user, such as image size and image resolution. At this step, the computer system 614 also generates an electromagnetic field within the sample holder 500 of the apparatus 600 according to a predetermined alternating voltage of a select frequency.

After start-up, processing proceeds to step 804. In step 804, the computer system 614 of the apparatus 600 sets the electromagnetic field according to a given voltage and frequency of each controller unit 606 and sets the orientation of the sample 204. In the next step 806, the computer system 614 sets the address pointer for the empty data values. The "empty" data values are the total surface charges Q when a sample 204 is not in the apparatus 600; that is, only the matching medium 602 is present in the sample holder 500. Step 806 is described in greater detail below.

Processing then continues to step 808. In step 808, an object 204 to be imaged is placed between the capacitive sensor arrays 604a–d, or the sample holder, of the apparatus 600. Proceeding to step 810, the apparatus 600 waits for a trigger from the imaging system to which it is connected. By using this triggering mechanism, the sensor measurements of the total surface charge Q and the acquired image data are acquired at precisely the same time, for the same condition of the object 204. The imaging system may be used for triggering the apparatus 600 at a convenient time for acquiring optimum information about the object 204, such as at specifically monitored portions of the cardiac or pulmonary cycle of a human subject. Upon receiving the trigger from the imaging system, the apparatus 600 continues to step 812.

In step 812, the computer system 614 commands the controller units 606a–f to poll their sensors, the phase sensitive detectors 712, 714, and measure the total charge Q on the segmented sensor plate 606. This represents the full data values which are the total surface charges Q when the sample 204 is located within the sample holder 500 of the apparatus 600. This polling of the sensors is performed in parallel so that the time averaging for any one measurement is the same as the time averaging for all measurements. Once the data is received, the apparatus 600 continues to step 814. In step 814, the computer system 614 sets a data pointer to the full data it just read from the polling of the sensors and proceeds to step 816.

In step 816, the computer system 614 determines whether there are additional measurements to be made with a new orientation for the sample 204 or the electric field as it is contained within the sample holder 500 of the apparatus 600. If another measurement is to be made, the computer system 614 returns to step 804 to restart its data acquisition sequence. After all the prescribed measurements are made, the computer system 614 computes the electrical properties for each pixel in the subject 204 and produces an image thereof. Step 818 is described in greater detail below. When the electrical properties image has been produced, the computer system 614 proceeds to step 820, thereby completing its processing.

The final measurements of dielectric constant and conductivity electrical properties of a object 204 can be used in various ways. In the preferred embodiment, the final measurements are used to indicate whether certain tissue in a sample 204 is living or dead, or whether the tissue has a pathology such as clogged arteries and veins, or a cancerous tumor. This information may be presented to a user either in a numerical or enumerated format, a graphical format, or a combination of both. However, in the preferred embodiment the calculated electrical values are used to modulate the intensity and/or color of corresponding image pixels.

FIG. 9 is a block diagram illustrating the processing of step 806 which sets the data pointer for the empty data set. The process begins at step 902 and immediately proceeds to step 904 which determines the source of values to be used in the empty data set. If stored data values from a database are to be used, the computer system 614 proceeds to step 906. In step 906, the computer system 614 sets a pointer to the storage location of the empty data set values according to the appropriate database values and continues to step 914, thereby returning to FIG. 8 and step 808.

Referring again to step 904, if the computer system 614 determines that it must make measurements for the empty data set, the computer system 614 proceeds to step 908. In step 908, the computer system 614 waits for a trigger from the imaging system. The imaging system may make a preliminary image of the empty sample holder 500 and transmit this imaging data to the computer system 614 of the apparatus 600, thereby triggering the apparatus 600 to continue its processing at step 910. It is important to note that the imaging system need not make an image of an empty sample holder 500, but doing so allows for the checking of the data.

In step 910, the computer system 614 commands the phase sensitive detectors 712, 714 of the controller units 606a–f to apply the prescribed voltages and poll their sensors and measure the total charges Q on the segmented sensor plates 606. Once the charge data is received, the apparatus 600 stores this empty data set and continues to step 912. In step 912, the computer system 614 sets a data pointer to the address location for the empty data set and proceeds to step 914, thereby returning to FIG. 8 and step 808.

The electrical properties are calculated from the acquired charge data in accordance with the steps shown in FIG. 10. As indicated at step 1004, the first task is to subtract the empty data from the first set of charge measurements. This produces a set of surface charge data Q which reflects the charges q inside the subject being imaged as set forth above in equation (4). The resulting charge measurements Q acquired at corresponding sensors 502 on opposite sides 506 and 508 or top and bottom 510 ad 512 of the sample holder 500 are either added together or subtracted at step 1006. In the preferred embodiment they are added.

As indicated at step 1008, an array of L transformation coefficients are then calculated from the resulting surface charge data Q(x) as set forth in equation (7) above. In the preferred embodiment L is set equal to the number of pixels in the prescribed image (i.e. number of internal charge locations $q_i$). The resulting Fourier transform array FT(L) indicates values of the frequency constituents of the acquired surface charge data.

The next step as indicated at step 1010 is to multiply the Fourier transform array FT(L) by the appropriate stored correlation matrix $\overline{M}^T$. As indicated above, correlation matrices are calculated for each sample holder 500 and each prescribable image resolution. As indicated above by equation (11), this results in a numerical value for the charge q at each pixel i in the subject. These values are stored at step 1012 in an array to form a charge image.

As indicated at step 1014, a voltage image is calculated next as set for above in equation (3). This image indicates the voltage produced at every pixel in the image due to the applied external sinusoidal voltage. As indicated at decision block 1016, a determination is then made if further measurements are to be made to increase the image SNR. As indicated above, these additional measurements can be made by changing the direction of the field produced by the applied voltages and the relative orientation of the subject as set forth above in TABLE 1. In the preferred embodiment all four orientations listed in TABLE 1 are acquired with the result that four voltage images are produced by the processing loop indicated at 1018.

The voltage images are combined to form a single, high SNR voltage image at step 1020. This is done by computing the average value at each image pixel. Other electrical parameters such as dielectric constant and conductivity can now be calculated from the voltage image. As indicated at step 1022, this is done by first computing the electric field everywhere using the reconstructed voltage image and Equation (1C). Then, the technique described above with regard to Equation (12) is performed in step 1024 to calculate the dielectric constant Ar and the conductivity or at each image pixel. These calculated values may be used to produce separate images as described above, or the values may be tabulated.

What is claimed is:

1. A method for producing an image of an electrical characteristic of an object, the steps comprising:
   a) applying a voltage to the surface of the object with an array of sensor elements;
   b) measuring the surface charge at each sensor element that results from the applied voltage;
   c) transforming the surface charge measurements;
   d) calculating the distribution of charges inside the object by multiplying the transformed surface charge measurements by a stored charge correlation matrix; and
   e) producing an image of an electrical property of the object from the internal charge distribution data calculated in step d).

2. The method as recited in claim 1 in which the array of sensor elements includes a first set of sensor elements disposed on one side of the object and a second set of sensor elements disposed on the other side of the object, and step a) is performed by applying the voltage across said first and second set of sensor elements.

3. The method as recited in claim 2 in which the surface charge is measured at each sensor element by measuring the current flowing therethrough over a preselected time interval.

4. The method as recited in claim 3 in which step b) includes combining the surface charge measurements from corresponding sensor elements in the first and second sets of sensor elements.

5. The method as recited in claim 4, in which the surface charge measurements are combined by addition.

6. The method as recited in claim 1 which includes inserting an impedance matching media between the sensor elements and the surface of the object.

7. The method as recited in claim 1 in which the image produced in step e) indicates the electrical conductivity throughout the object.

8. The method as recited in claim 1 in which the image produced in step e) indicates the dielectric constant throughout the object.

9. The method as recited in claim 1 in which the image produced in step e) is produced by setting the intensity of each pixel in the image to a level corresponding to the value of the electrical property at the corresponding location in the object.

10. The method as recited in claim 1 in which the image produced in step e) is produced by setting the color of each pixel in the image as a function of the value of the electrical property at the corresponding location in the object.

11. The method as recited in claim 1 in which the transformation performed in step c) is a Fourier transformation.

12. An imaging system for producing an image of an electrical property of an object which comprises:

an array of sensor elements for placement in electrical contact with the surface of the object;

means for applying a voltage to the array of sensor elements;

means for measuring the electrical charge at each of the sensor elements while the voltage is applied;

means for transforming the measured electrical charges to a set of transformed surface charges;

a memory storing a charge correlation matrix which relates transformed surface charges at the sensor element to internal charges at an internal array of locations in the object;

means for calculating the distribution of charges at the internal array of locations in the object by multiplying the set of transformed surface charges by the stored charge correlation matrix; and means for producing an image from the charge distribution by calculating the value of an electrical property at each location in the internal array of locations.

13. The imaging system as recited in claim 12 in which a plurality of charge correlation matrices are provided, each charge correlation matrix being associated with a selected arrangement of sensor elements and a selected internal array of locations.

14. The imaging systems as recited in claim 13 which includes means for selecting one of the plurality of charge correlation matrices based on a prescribed image resolution.

* * * * *